W. R. FRIEDEL.
MOLDING.
APPLICATION FILED FEB. 14, 1914.
1,113,896.
Patented Oct. 13, 1914.
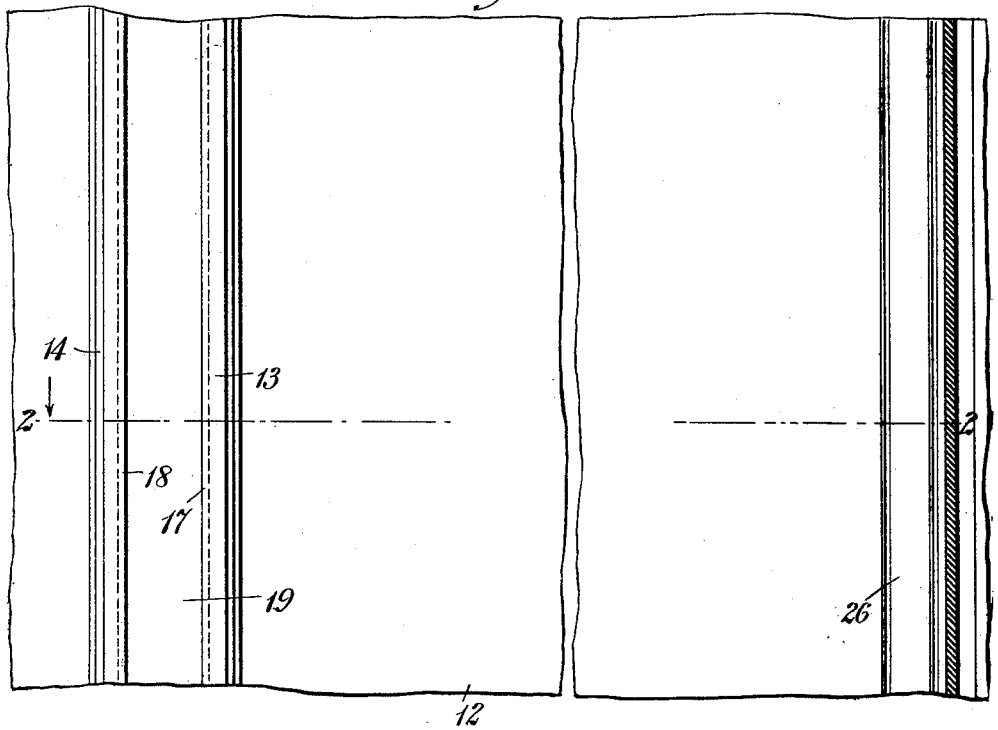
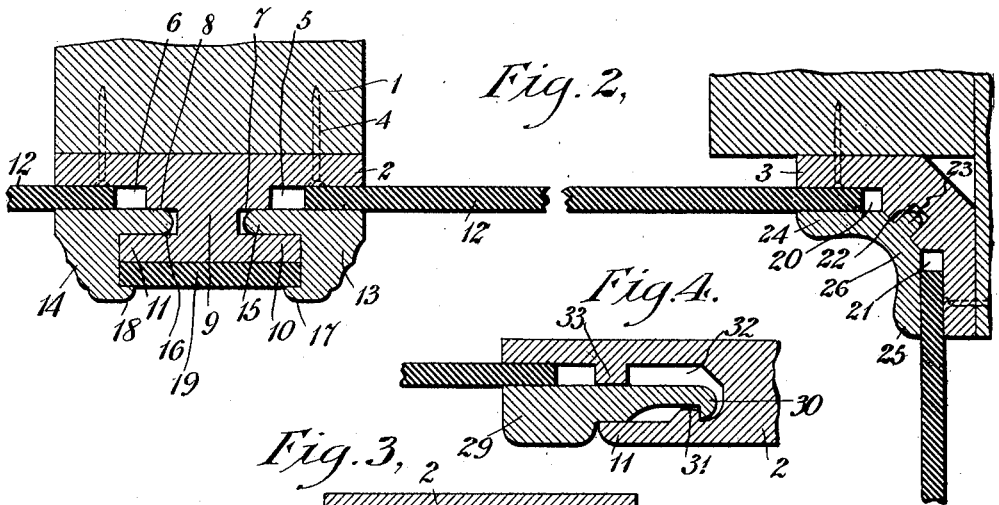
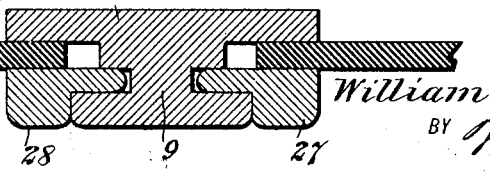
WITNESSES
Edw. Thorpe
A. L. Kitchin
INVENTOR
William R. Friedel
BY Munn & Co
ATTORNEYS

UNITED STATES PATENT OFFICE.

WILLIAM R. FRIEDEL, OF MEMPHIS, TENNESSEE.

MOLDING.

1,113,896.     Specification of Letters Patent.     Patented Oct. 13, 1914.

Application filed February 14, 1914. Serial No. 818,680.   REISSUED

*To all whom it may concern:*

Be it known that I, WILLIAM R. FRIEDEL, a citizen of the United States, and a resident of Memphis, in the county of Shelby and State of Tennessee, have invented a new and Improved Molding, of which the following is a full, clear, and exact description.

This invention relates to improvements in molding, and has for an object to provide an improved structure for receiving wall boards or materials of similar nature.

Another object in view is to provide a molding which will receive wall boards or paneling and allow for ample expansion while clamping the boards firmly in place.

In carrying out the object of the invention the molding may be made in slightly different ways so as to accommodate different places in the building, as for instance the ordinary side wall or ceiling and the corner. In forming the molding a rabbet is provided merging into a suitable groove which receives a clamping member for clamping the board or panel in place, which has one edge arranged in said rabbet. The clamping members may be arranged to only clamp the board in place, or may be arranged to act as trimming members provided with overhanging hooks for clamping an extra strip of board in place centrally of the molding, whereby a trimming effect is produced.

In the accompanying drawings—Figure 1 shows a side view of part of a wall disclosing an embodiment of the invention; Fig. 2 is a section through Fig. 1 approximately on line 2—2; Fig. 3 is a sectional view through a slightly modified form of molding. Fig. 4 is a fragmentary view similar to Fig. 3, but disclosing a slightly modified form of the invention.

Referring to the accompanying drawings by numeral, 1 indicates a suitable studding which is part of any desired kind of wall and 2 and 3 the moldings. The molding 2 is secured to the support 1 by any suitable means, as for instance nails 4. In forming the molding 2 it will be observed that a pair of rabbets 5 and 6 are provided which merge into grooves 7 and 8. By providing these rabbets on opposite sides of the molding 2 a central body 9 is presented having overhanging flanges 10 and 11, which overhanging flanges overlap part of the rabbets 5 and 6. Rabbets 5 and 6 are designed to accommodate boards or panels 12 which may be what is known as wall board. In order to hold the boards 12 in place retaining strips 13 and 14 are provided which are formed with flanges 15 and 16, respectively, for fitting into the grooves 7 and 8. The strips 13 and 14 are provided with overhanging portions 17 and 18, whereby channels are presented which accommodate the flanges 10 and 11, and also the edges of a strip of wall board 19.

In connection with the molding 3 it will be observed that the same is formed for a corner, and that notches 20 and 21 are provided, together with a groove 22 in which a bead 23 is fitted so that the flanges 24 and 25 of clamping member 26 may press against the wall board 12 for clamping the same tightly in notches 20 and 21. The member 26 may be held in place by suitable nails or other securing means. In both the corner construction and the molding 2 ample space is provided in the rabbets 5 and 6, and notches 20 and 21, for permitting a free expansion of the various parts.

In Fig. 3 a slightly modified form of the invention is disclosed wherein strips 27 and 28 are provided which are similar to strips 13 and 14 except that the overhanging portions 17 and 18 are eliminated, and the strips merely provided with heads so as to properly flush with the surface of body 9. It will also be noted that the inner ends of members 13 and 14 as well as members 27 and 28 are rounded, and fall short of the bottom of the grooves to which they are fitted so that the strips may be driven up tight on the face side in order to make a good mechanical joint.

In Fig. 4 is seen a slightly further modified form of the invention in which the strip 29 is provided with a hooked end 30 adapted to hook over the bead 31 formed on member 2. It is to be observed that member 2 is provided with a chamber 32 so as to easily insert the hooked end 30. In order to cause a proper fit a strip 33 is provided which co-acts with member 11 and hooked end 30 for properly holding member 29 in place. In inserting member 29 the same snaps into the position shown in Fig. 4 and consequently is held against displacement.

What I claim is—

A molding strip comprising a body provided with a rabbet on each side and a groove merging into said rabbet, said body being also formed with a face portion arranged on one side of said groove and falling short of the edges of the body, and retaining strips co-acting with said rabbets and said groove for holding in place a wall board extending into said rabbets and arranged on the surface of said face, each of said strips having a bead extending into said groove, and an overhanging edge overhanging the board arranged on said face, whereby said strips clamp the board on said face in position, and the boards having their edges in said rabbets.

In testimony whereof I have signed my name to this specification in the presence of two subscribing witnesses.

WM. R. FRIEDEL.

Witnesses:
H. H. HONNOLL,
MARION G. EVANS.